United States Patent
Shimose et al.

(10) Patent No.: US 9,665,996 B2
(45) Date of Patent: May 30, 2017

(54) NEGATIVE PRESSURE ABNORMALITY DETECTION APPARATUS AND CONTROL APPARATUS FOR INTERNAL COMBUSTION ENGINE

(71) Applicant: Toyota Jidosha Kabushiki Kaisha, Toyota-shi Aichi-ken (JP)

(72) Inventors: Fumichika Shimose, Toyota (JP); Hirokazu Kato, Nissin (JP); Junpei Kakehi, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/965,204

(22) Filed: Dec. 10, 2015

(65) Prior Publication Data
US 2016/0171792 A1  Jun. 16, 2016

(30) Foreign Application Priority Data
Dec. 15, 2014  (JP) .................................. 2014-253411

(51) Int. Cl.
*F02D 41/22*  (2006.01)
*B60T 7/04*  (2006.01)
(Continued)

(52) U.S. Cl.
CPC ............... *G07C 5/08* (2013.01); *B60T 7/042* (2013.01); *B60T 13/46* (2013.01); *B60T 13/52* (2013.01);
(Continued)

(58) Field of Classification Search
CPC ................. F02D 41/042; F02D 41/222; F02D 2200/0406; F02D 2200/101;
(Continued)

(56) References Cited

U.S. PATENT DOCUMENTS 4,802,454 A * 2/1989 Tanaka .................. F02P 5/1522
                                                      123/406.16
6,105,556 A * 8/2000 Takaku .............. F02M 25/0809
                                                      123/198 D
(Continued)

FOREIGN PATENT DOCUMENTS

JP  2011-122519 A  6/2011
JP  2014-070531 A  4/2014
JP  2016-000972 A  1/2016

*Primary Examiner* — John Kwon
*Assistant Examiner* — Johnny H Hoang
(74) *Attorney, Agent, or Firm* — Dinsmore & Shohl LLP

(57) ABSTRACT

A negative pressure detection part detects a negative pressure from a signal of a negative pressure sensor detecting a negative pressure generated due to rotation of an internal combustion engine. The negative pressure is used to assist a vehicle driver's braking operation. An abnormality determination part determines, during continuation of the internal combustion engine stopped state, that the negative pressure sensor is in an abnormal condition if the detected negative pressure is out of a normal range near an atmospheric pressure to a vacuum pressure side when an operation of decreasing the negative pressure is performed on a brake pedal greater than or equal to a predetermined number of times or greater than or equal to a predetermined period of time or when a total operation amount of the decreasing operation is greater than or equal to a predetermined amount.

12 Claims, 4 Drawing Sheets

(51) Int. Cl.
*G07C 5/08* (2006.01)
*B60T 13/52* (2006.01)
*F02N 11/08* (2006.01)
*B60T 13/46* (2006.01)
*B60T 17/02* (2006.01)
*B60T 17/22* (2006.01)
*F02D 41/04* (2006.01)

(52) U.S. Cl.
CPC .............. *B60T 17/02* (2013.01); *B60T 17/22* (2013.01); *F02D 41/222* (2013.01); *F02N 11/084* (2013.01); *F02D 41/042* (2013.01); *F02D 2200/0406* (2013.01); *F02D 2200/101* (2013.01); *F02D 2200/703* (2013.01); *Y02T 10/40* (2013.01)

(58) Field of Classification Search
CPC ........... F02D 2200/703; F02D 2250/41; F02N 11/084; F02N 11/0825; F02N 11/108; F02N 2200/0807; F02N 2200/102; F02N 2300/2011; B60W 10/06; B60W 10/184; B60W 30/18018; B60W 2050/0215; B60W 2510/0638; B60W 2510/0671; B60T 7/042; B60T 13/46; B60T 13/52; B60T 17/02; B60T 17/22; Y02T 10/40
USPC .............. 701/110–115; 123/179.4, 690, 703; 73/114.18, 114.33, 114.37, 114.73
See application file for complete search history.

(56) References Cited

U.S. PATENT DOCUMENTS

| | | | |
|---|---|---|---|
| 2013/0057055 A1* | 3/2013 | Miyashita | B60T 13/52 303/12 |
| 2015/0178997 A1* | 6/2015 | Ohsaki | G07C 5/0825 701/29.1 |
| 2015/0360699 A1* | 12/2015 | Sakai | B60T 13/52 701/70 |
| 2016/0169139 A1* | 6/2016 | Kato | B60T 8/885 123/179.4 |
| 2016/0185333 A1* | 6/2016 | Kakehi | B60T 17/221 701/112 |

* cited by examiner

NEGATIVE PRESSURE ABNORMALITY DETECTION APPARATUS AND CONTROL APPARATUS FOR INTERNAL COMBUSTION ENGINE

CLAIM OR PRIORITY

This application claims priority to Japanese Patent Application No. 2014-253411, filed on Dec. 15, 2014, the entire contents of which are hereby incorporated by reference.

BACKGROUND

1. Field

The present disclosure relates to a negative pressure abnormality detection apparatus and a control apparatus for an internal combustion engine.

2. Description of the Related Art

In the related art, a negative pressure abnormality detection apparatus determining an abnormality in a negative pressure sensor is known (for example, see Japanese Laid-Open Patent Application No. 2011-122519). Such a negative pressure abnormality detection apparatus has a negative pressure sensor that outputs a signal corresponding to a negative pressure, and detects the negative pressure based on the signal from the negative pressure sensor. Then, based on the negative pressure detection result, the negative pressure abnormality detection apparatus determines whether the negative pressure sensor has an abnormality. Actually, if a state where the signal from the negative pressure sensor is out of a normal range continues greater than or equal to a predetermined period of time due to a wire disconnection, a short circuit failure of a power supply, a short circuit failure to ground, or so, the negative pressure abnormality detection apparatus determines that the negative pressure sensor is in an abnormal condition.

Also, a vehicle mounting such a negative pressure abnormality detection apparatus has a brake booster assisting the driver's braking operation using a negative pressure generated through rotation of an internal combustion engine. Such a vehicle is an idling-stop vehicle automatically stopping the internal combustion engine when a predetermined stopping condition is satisfied, and, after the automatic stopping, automatically restarts the internal combustion engine when a predetermined restart condition is satisfied. Further, if it is determined that the negative pressure sensor is in an abnormal condition as mentioned above, automatic stopping of the internal combustion engine is inhibited.

SUMMARY

According to one aspect of the present disclosure, a negative pressure abnormality detection apparatus includes a negative pressure sensor that outputs a signal corresponding to a negative pressure that a negative pressure generation part generates through rotation of an internal combustion engine, the negative pressure assisting a vehicle driver's tread operation onto a brake pedal; a negative pressure detection part that detects the negative pressure based on the signal that is output by the negative pressure sensor; and an abnormality determination part that determines, during a period of time when a stopped state of the internal combustion engine is being continued, that the negative pressure sensor is in an abnormal condition if the negative pressure detected by the negative pressure detection part is out of a normal range near an atmospheric pressure to a vacuum pressure side under the condition where a negative pressure decreasing operation of reducing the negative pressure has been performed on the brake pedal greater than or equal to a predetermined number of times or greater than or equal to a predetermined period of time or under the condition where a total operation amount of the negative pressure decreasing operation is greater than or equal to a predetermined amount.

According to another aspect of the present disclosure, a negative pressure abnormality detection apparatus includes a negative pressure sensor that outputs a signal corresponding to a negative pressure that a negative pressure generation part generates through rotation of an internal combustion engine, the negative pressure assisting a vehicle driver's tread operation onto a brake pedal; a negative pressure detection part that detects the negative pressure based on the signal that is output by the negative pressure sensor; and an abnormality determination part that determines that the negative pressure sensor is in an abnormal condition if the negative pressure detected by the negative pressure detection part is out of a normal range near an atmospheric pressure to a vacuum pressure side when a stopped state of the internal combustion engine has been continued greater than or equal to a predetermined period of time.

Other objects, features and advantages of the present disclosure will become more apparent from the following detailed description when read in conjunction with the accompanying drawings.

DETAILED DESCRIPTION OF THE EMBODIMENTS

As the above-mentioned abnormality in the negative pressure sensor, in addition to the above-mentioned wire disconnection, short circuit failure of a power supply, or short circuit failure to ground, there can be a deviation abnormality in that a gain deviation, an offset deviation, or so, occurs due to temperature characteristics, aging, or so, while the negative pressure sensor itself outputs the signal changing according to the negative pressure. However, in the control apparatus disclosed in the above-mentioned Japanese Laid-Open Patent Application No. 2011-122519, it is not possible to determine that the negative pressure sensor has an abnormality unless a state where the output signal is out of the above-mentioned desired normal range occurs. Therefore, the control apparatus in the related art is not capable of detecting a deviation abnormality of the negative pressure sensor, if a gain deviation or an offset deviation is relatively small so that the output signal falls within the desired normal range. Therefore, there may be a case where, even if a deviation abnormality occurs in the negative pressure sensor, it cannot actually be detected as an abnormality.

The embodiments have been devised in consideration of such circumstances, and some embodiments described herein provide a negative pressure abnormality detection apparatus capable of detecting such a deviation abnormality occurring in a negative pressure sensor that a sensor value of the negative pressure sensor deviates from an actual negative pressure to a vacuum pressure side (simply referred to as a "vacuum-pressure-side deviation abnormality", hereinafter), and a control apparatus for an internal combustion engine capable of avoiding an inconvenience otherwise occurring due to automatic stopping of the internal combustion engine being carried out although such a vacuum-pressure-side deviation abnormality occurs in the negative pressure sensor.

Note that, below, a term "stopped state of (an internal combustion engine)" can mean, in addition to a state where the internal combustion engine has been completely stopped, a state where the internal combustion engine is rotated too slowly for a negative pressure generation part to generate a negative pressure.

Below, using the accompanying drawings, the embodiments of negative pressure abnormality detection apparatuses and control apparatuses for internal combustion engines will be described.

Figure 1:
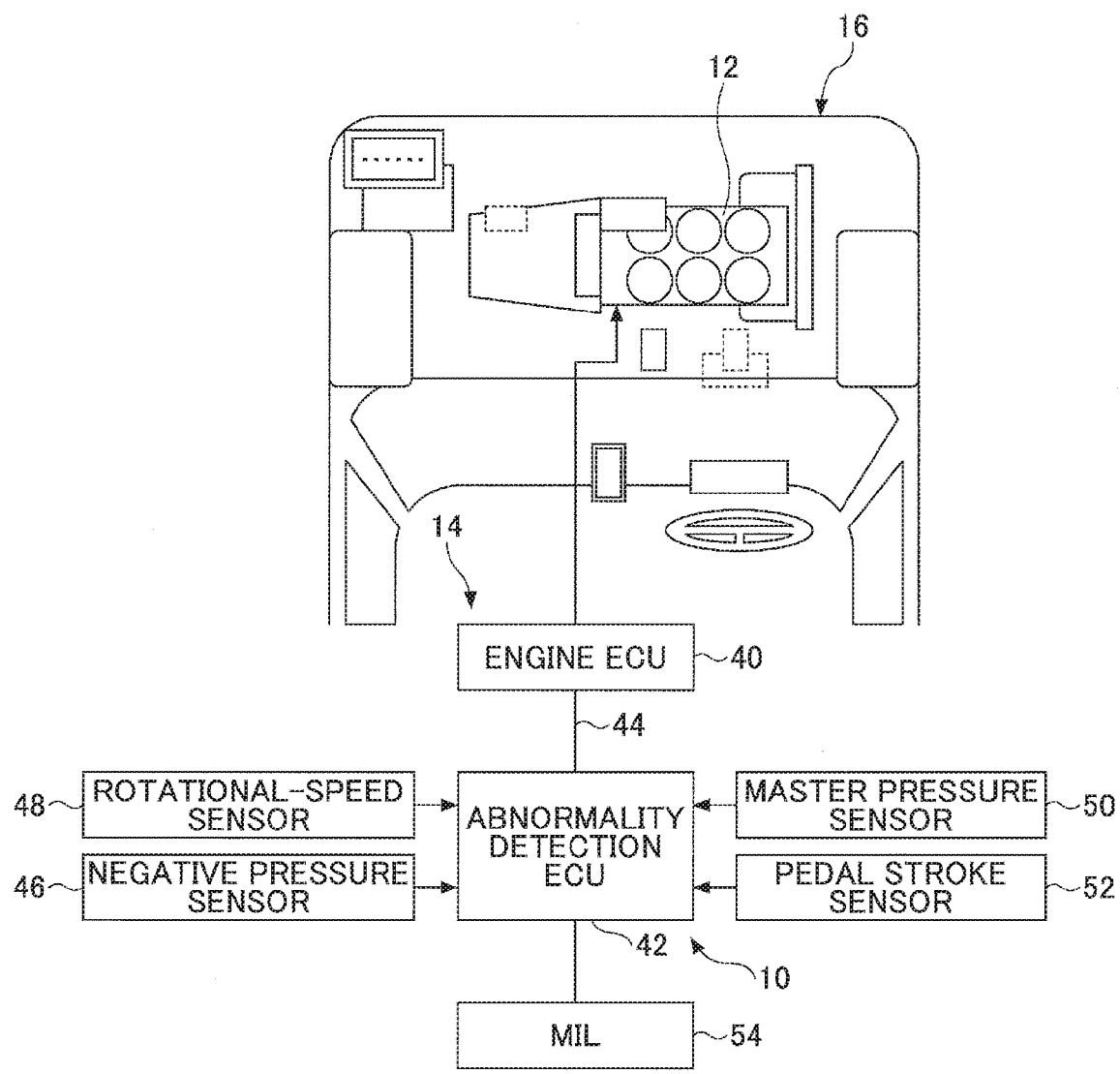
FIG. 1 illustrates a system configuration of a vehicle including a negative pressure abnormality detection apparatus and a control apparatus for an internal combustion engine according to a first embodiment.
Figure 2:
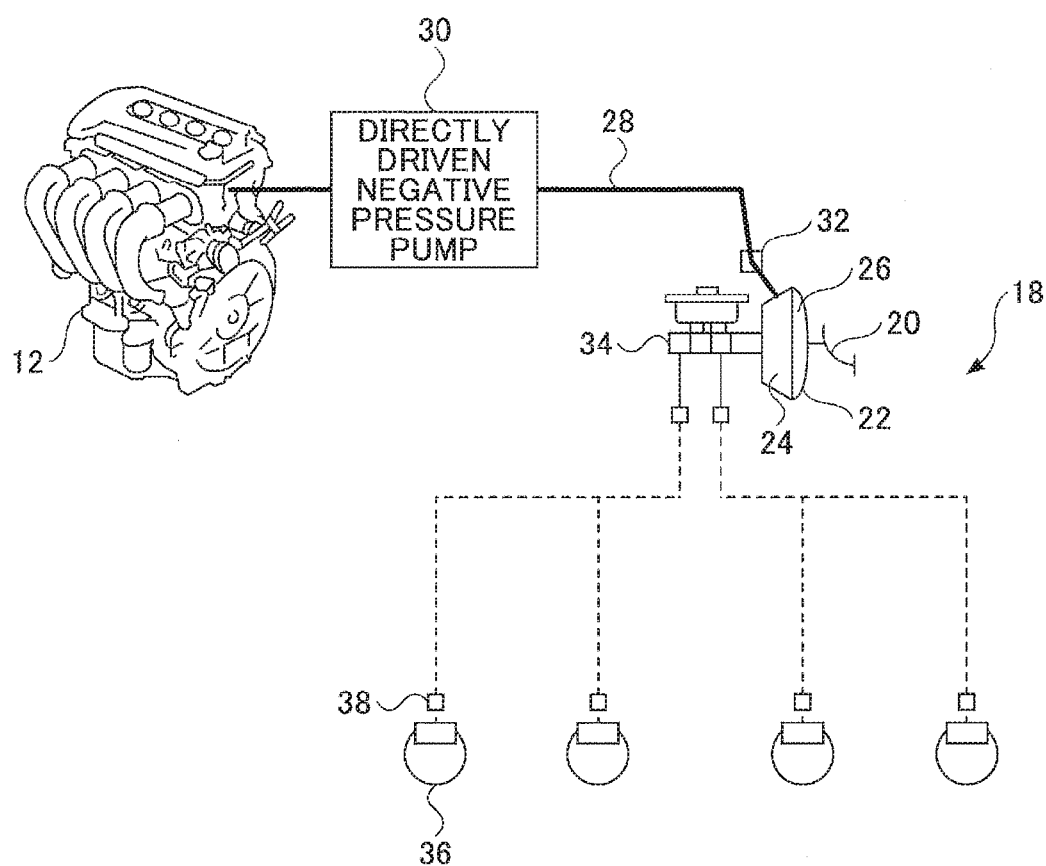
FIG. 2 illustrates a configuration of a brake system mounted in the vehicle according to the first embodiment.

FIG. 1 illustrates a system configuration of a vehicle 16 including a negative pressure abnormality detection apparatus 10 and a control apparatus 14 for an internal combustion engine 12 according to the first embodiment. FIG. 2 illustrates a configuration of a brake system 18 mounted in the vehicle 16 according to the first embodiment.

As shown in FIGS. 1 and 2, the vehicle 16 in the first embodiment includes the internal combustion engine 12 and the brake system 18. The internal combustion engine 12 is a heat engine generating vehicle motive power through explosive combustion of fuel. The internal combustion engine 12 can be a gasoline engine or a diesel engine. The internal combustion engine 12 can be configured so as to be started by an engine starter that is driven by electric power supplied from an on-vehicle battery.

The brake system 18 has a brake pedal 20 and a brake booster 22. The brake pedal 20 is operated (trodden on) by the driver (in particular, with a foot thereof) of the vehicle 16. The brake pedal 20 is a pedal with which the driver performs a brake tread operation to increase the tread force or the tread amount for increasing the braking force of the vehicle 16. Also, the brake pedal 20 is a pedal with which the driver performs a brake returning operation to reduce the tread force or the tread amount for reducing the braking force from the state where the tread operation has been thus performed. The brake booster 22 is linked with the brake pedal 20.

The brake booster 22 has, inside thereof, a negative pressure chamber 24 and a pressure change chamber 26 separated with a diaphragm installed therebetween. A directly driven negative pressure pump 30 is connected to the negative pressure chamber 24 through a negative pressure pipe 28. In the middle of the negative pressure pipe 28, a check valve 32 that is a one-way valve permitting only an airflow directed toward the directly driven negative pressure pump 30 from the negative pressure chamber 24 is installed. The check valve 32 opens when the pressure in the negative pressure pipe 28 at the side of the negative pressure chamber 24 is greater than that at the side of the directly driven negative pressure pump 30.

The directly driven negative pressure pump 30 is a pump supplying a negative pressure lower than atmospheric pressure to the negative pressure pipe 28 and the negative pressure chamber 24 (of the brake booster 22) as a result of being driven according to rotation of the internal combustion engine 12. Note that, hereinafter, the expression that "the negative pressure is greater" means that the pressure is in a state of being closer to the zero kPa (vacuum pressure), and the expression that "the negative pressure is less" means that the pressure is in state of being closer to atmospheric pressure. Also, the expression that "the negative pressure increases" or "the negative pressure is increased" means that the pressure changes or is changed to the side closer to zero and the expression that "the negative pressure decreases" or "the negative pressure is decreased" means that the pressure changes or is changed to the side closer to atmospheric pressure.

The directly driven negative pressure pump 30 is connected to a cam of the internal combustion engine 12, and, as a result of being rotated at, for example, half the rotational speed of the internal combustion engine 12, supplies a negative pressure to the negative pressure pipe 28. The negative pressure thus supplied to the negative pressure pipe 28 is then supplied to the negative pressure chamber 24. In the negative pressure chamber 24, a negative pressure corresponding to the rotation of the directly driven negative pressure pump 30, i.e., the rotation of the internal combustion engine 12, is generated. The directly driven negative pressure pump 30 has such a property as to be able to generate a negative pressure greater than or equal to a predetermined level (in particular, near zero kPa) in the negative pressure chamber 24 if a state where the rotational speed of the internal combustion engine 12 is greater than or equal to a predetermined value has been continued greater than or equal to a predetermined period of time.

If the brake pedal 20 is not trodden on, i.e., if a tread operation on the brake pedal 20 is removed, the negative pressure in the negative pressure chamber 24 is supplied to the pressure change chamber 26 of the brake booster 22. In this case, the difference in pressure between the pressure change chamber 26 and the negative pressure chamber 24 is not very great. On the other hand, if the brake pedal 20 is trodden on, the atmospheric air is supplied to the pressure change chamber 26 depending on the brake tread force applied to the brake pedal 20. In this case, a pressure difference depending on the brake tread force is generated between the negative pressure chamber 24 and the pressure change chamber 26. The pressure difference acts as an assisting force to the brake tread force applied to the brake pedal 20 at a predetermined multiplication ratio.

Thus, during rotation of the directly driven negative pressure pump 30, i.e., during rotation of the internal combustion engine 12, the brake booster 22 generates an assisting force supplementing the driver's brake tread force applied to the brake booster 22 by using the negative pressure in the negative pressure chamber 24, when the brake pedal 20 is trodden on. Note that, the negative pressure in the negative pressure chamber 24 of the brake booster 22 varies depending on the driving period of time and the stopped period of time of the internal combustion engine 12, and the operation of the brake pedal 20.

A master cylinder 34 having a hydraulic chamber filled with a brake oil is linked to the brake booster 22. A master cylinder pressure is generated in the hydraulic chamber of the master cylinder 34 according to the resultant force of the brake tread force and the assisting force of the brake booster 22. Wheel cylinders 38 installed at respective wheels 36 are connected to the master cylinder 34. Each wheel cylinder 38 applies brake force to the corresponding wheel 36 according to the master cylinder pressure in the master cylinder 34.

The control apparatus 14 mounted in the vehicle 16 includes an engine controlling electronic control unit (hereinafter, simply referred to as an "engine ECU") 40 mainly including a microcomputer. Actuators, an engine starter, and so forth, of an injector, a fuel pump, and so forth, for jetting fuel of the internal combustion engine 12, are electrically connected to the engine ECU 40. The engine ECU 40 controls driving and stopping the respective actuators and starting and stopping the engine starter of the internal combustion engine 12.

Also, the engine ECU 40 has such a configuration as to be able to automatically stop the internal combustion engine 12 when a predetermined stopping condition is satisfied, and also, automatically start (restart) the internal combustion engine 12 when a predetermined restart condition is satisfied after the internal combustion engine 12 has been thus automatically stopped. Hereinafter, such a way of control will be referred to as "start and stop" ("S & S") control. That is, the vehicle 16 is an idling-stop vehicle carrying out S & S control. Thanks to S & S control, it is possible to reduce the fuel consumption because the internal combustion engine 12 can be automatically stopped when the predetermined stopping condition is satisfied.

The above-mentioned predetermined stopping condition in S & S control can be that, after the internal combustion engine 12 is started and travelling of the vehicle 16 is started, the vehicle 16 is decelerated as a result of, for example, a brake tread operation of the driver's treading on the brake pedal 20 being performed (for example, the vehicle speed is reduced to be less than or equal to a predetermined vehicle speed, and/or the deceleration of the vehicle 16 becomes greater than or equal to a predetermined deceleration). The above-mentioned predetermined restart condition can be that, after execution of S & S control is started, the above-mentioned brake pedal returning operation and/or an accelerator operation is performed, the on-vehicle electricity load increases to be greater than or equal to a predetermined value, and/or the like.

The negative pressure abnormality detection apparatus 10 mounted in the vehicle 16 includes a negative pressure abnormality detection electronic control unit (hereinafter, simply referred to as an "abnormality detection ECU") 42 mainly including a microcomputer. The abnormality detection ECU 42 and the engine ECU 40 are connected via an in-vehicle Local Area Network (LAN) 44. The in-vehicle LAN 44 is a communication bus such as, for example, a Controller Area Network (CAN). The abnormality detection ECU 42 and the engine ECU 40 can mutually send and receive data via the in-vehicle LAN 44.

A negative pressure sensor 46 is connected to the abnormality detection ECU 42. The negative pressure sensor 46 is placed at a position where the negative pressure is generated due to rotation of the internal combustion engine 12, i.e., rotation of the directly driven negative pressure pump 30 (for example, the negative pressure chamber 24 of the brake booster 22 or the negative pressure pipe 28). The "position where the negative pressure is generated due to rotation of the internal combustion engine 12, i.e., rotation of the directly driven negative pressure pump 30" will be simply referred to as a "negative pressure generation position", hereinafter. The negative pressure sensor 46 outputs a signal corresponding to the negative pressure at the negative pressure generation position. The negative pressure sensor 46 is a sensor to monitor the negative pressure at the negative pressure generation position. The signal that is output from the negative pressure sensor 46 is supplied to the abnormality detection ECU 42. The abnormality detection ECU 42 detects the negative pressure Pvac at the negative pressure generation position based on the signal thus supplied by the negative pressure sensor 46.

The abnormality detection ECU 42 stops an automatic stopping operation and automatically starts the internal combustion engine 12 to secure the negative pressure in the negative pressure chamber 24, if the thus detected negative pressure Pvac has not been being kept to be greater than or equal to a predetermined negative pressure (in other words, if the detected negative pressure Pvac has a value on the side of atmospheric pressure from the predetermined negative pressure) during the automatic stopping of the internal combustion engine 12 due to S & S control. Actually, the abnormality detection ECU 42 sends an instruction to the engine ECU 40 via the in-vehicle LAN 44 to cause it to automatically start the internal combustion engine 12. As a result of the instruction being thus sent, the engine ECU 40 automatically starts the internal combustion engine 12 that has been automatically stopped due to S & S control. Thus, if a reduction in the negative pressure in the negative pressure chamber 24 occurs during automatic stopping of the internal combustion engine 12 due to S & S control, the internal combustion engine 12 is thus automatically started. Therefore, it is possible to restore the negative pressure in the negative pressure chamber 24.

It is also possible that the abnormality detection ECU 42 transmits data indicating the negative pressure Pvac thus detected to the engine ECU 40 via the in-vehicle LAN 44. In this case, the engine ECU 40 can use the negative pressure Pvac for controlling driving the respective actuators in the internal combustion engine 12, or so. Note that it is also possible that, instead, data indicating the negative pressure Pvac is supplied to the engine ECU 40 directly from the negative pressure sensor 46, and is used for controlling driving the respective actuators in the internal combustion engine 12, or so.

A rotational speed sensor 48 is connected to the abnormality detection ECU 42. The rotational speed sensor 48 can be installed at a crank shaft, a cam, or so, of the internal combustion engine 12. The rotational speed sensor 48 outputs a signal corresponding to the crank angle or the cam angle of the internal combustion engine 12. The signal that is output by the rotational speed sensor 48 is supplied to the abnormality detection ECU 42. The abnormality detection ECU 42 detects the crank angle or the cam angle of the internal combustion engine 12 based on the signal supplied from the rotational speed sensor 48, and detects the rotational speed NE of the internal combustion engine 12.

A master pressure sensor 50 is connected to the abnormality detection ECU 42. The master pressure sensor 50 is placed in the hydraulic chamber of the master cylinder 34. The master pressure sensor 50 outputs a signal corresponding to the pressure (i.e., the above-mentioned master cylinder pressure) in the hydraulic chamber of the master cylinder 34. The signal that is output by the master pressure sensor 50 is supplied to the abnormality detection ECU 42. The abnormality detection ECU 42 detects the pressure (hereinafter, referred to as a "master pressure") Pm in the hydraulic chamber of the master cylinder 34 based on the signal supplied by the master pressure sensor 50. Also, the abnormality detection ECU 42 detects "brake operation tread force" applied by the driver, regarding a value when the brake pedal 20 is not trodden on at all as a zero reference, based on the thus detected master pressure Pm.

A pedal stroke sensor 52 is connected to the abnormality detection ECU 42. The pedal stroke sensor 52 is a sensor outputting a signal corresponding to the driver's "brake operation stroke amount" on the brake pedal 20. The signal that is output by the pedal stroke sensor 52 is supplied to the abnormality detection ECU 42. The abnormality detection ECU 42 detects the brake operation stroke amount, regarding a value when the brake pedal 20 is not trodden on at all as a zero reference, based on the signal supplied from the pedal stroke sensor 52. The abnormality detection ECU 42 distinguishingly detects the brake tread amount and the brake return amount based on the temporal change in the detected brake operation stroke amount.

A malfunction indicator lamp (MIL) 54 that the driver can see is placed, for example, in a meter, and is connected to the abnormality detection ECU 42. As will be described later, the abnormality detection ECU 42 determines whether the negative pressure sensor 46 is in an abnormal condition (note that, the "abnormal condition" can be a deviation abnormal condition such as that caused by a gain deviation, an offset deviation, or so) based on the negative pressure Pvac in the negative pressure chamber 24 detected as mentioned above. If the abnormality detection ECU 42 determines that the negative pressure sensor 46 is in an abnormal condition, the abnormality detection ECU 42 sends an instruction to the engine ECU 40 via the in-vehicle LAN 44 to cause it to inhibit automatic stopping of the internal combustion engine 12 due to S & S control, carries out diagnostic storage of information indicating the abnormality of the negative pressure sensor 46, and also, turns on the MIL 54 to report the abnormality of the negative pressure sensor 46 or the inhibition of automatic stopping of the internal combustion engine 12.

Next, using FIG. 3, operation of the negative pressure abnormality detection apparatus 10 and the control apparatus 14 for the internal combustion engine 12 according to the first embodiment will be described.

Figure 3:
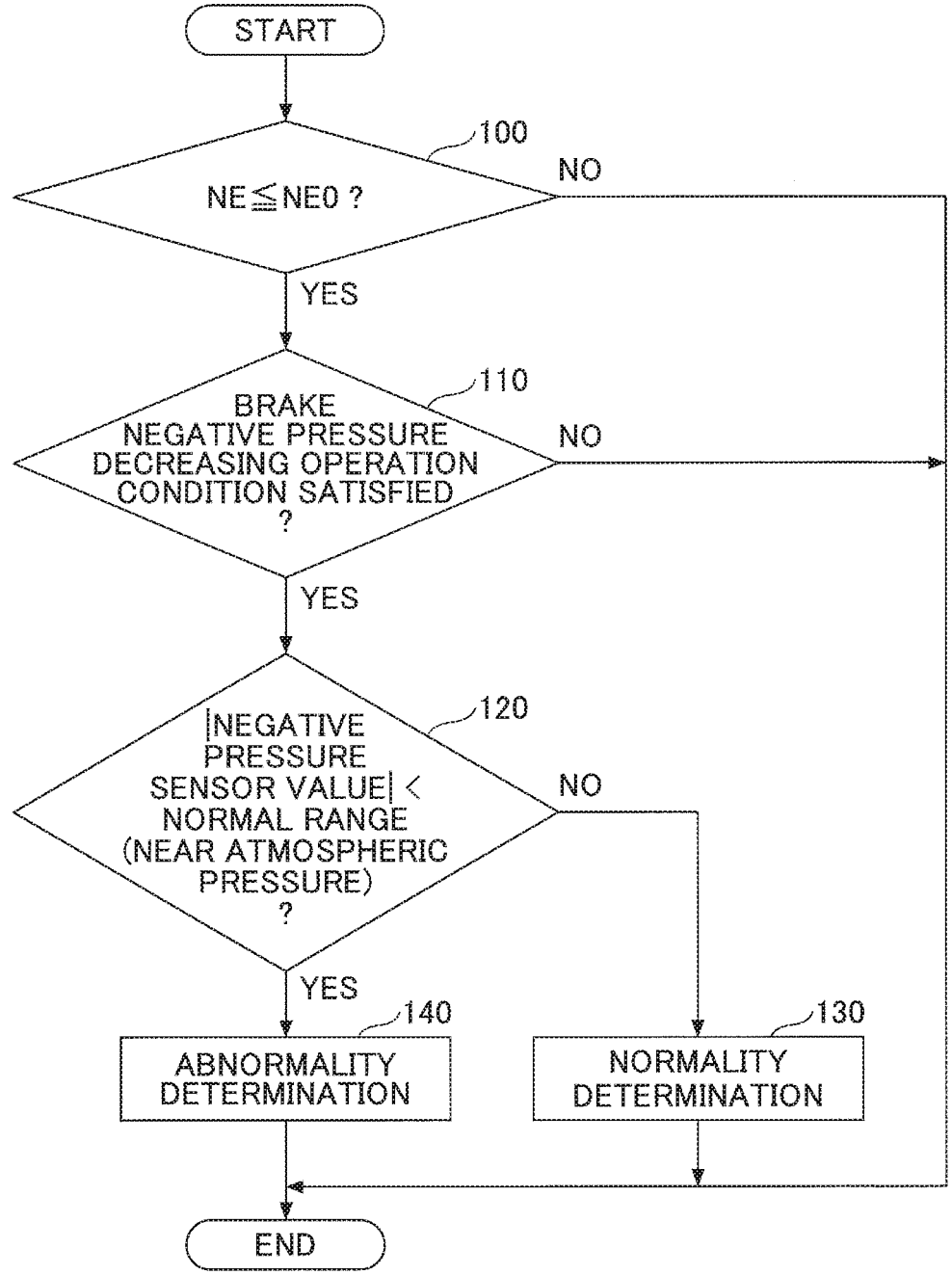
FIG. 3 is a flowchart illustrating an example of a control routine executed by the negative pressure abnormality detection apparatus and the control apparatus for the internal combustion engine according to the first embodiment.

FIG. 3 is a flowchart illustrating an example of a control routine executed by the negative pressure abnormality detection apparatus 10 and the control apparatus 14 for the internal combustion engine 12 according to the first embodiment.

In the brake system 18 of the first embodiment, during a state where the brake operation position of the brake pedal 20 (i.e., the brake operation stroke amount or the brake operation tread force) is changing, in other words, if the brake pedal 20 is being moved, the negative pressure in the negative pressure chamber 24 is decreasing. Actually, when a brake tread operation, i.e., the brake pedal 20 being trodden on, is performed, the capacity of the negative pressure chamber 24 of the brake booster 22 is reduced. As a result, the negative pressure in the negative pressure chamber 24 decreases to the atmospheric pressure side. Also, if the tread operation in the state where the brake pedal 20 is being trodden on is removed and a brake returning operation is performed, the brake tread force is reduced and the negative pressure in the negative pressure chamber 24 is supplied to the pressure change chamber 26 of the brake booster 22. As a result, the negative pressure in the negative pressure chamber 24 steeply decreases to the atmospheric pressure side.

Also, if a brake returning operation is performed on the brake pedal 20 during automatic stopping of the internal combustion engine 12 due to S & S control, the above-mentioned predetermined restart condition is satisfied, and thus, the internal combustion engine 12 is automatically started. As a result, an increase in the rotational speed of the internal combustion engine 12 occurs with a delay after the reduction in the negative pressure in the negative pressure chamber 24. After the internal combustion engine 12 is thus rotated, the directly driven negative pressure pump 30 is rotated accordingly, and thereby, the negative pressure in the negative pressure chamber 24 gradually increases from the atmospheric pressure side toward zero kPa. Note that such an increase in the negative pressure is stably continued depending on the performance of the directly driven negative pressure pump 30 if a brake operation condition on the brake pedal 20 hardly changes, i.e., neither a brake tread operation nor a brake returning operation is performed, in yet other words, the brake pedal 20 is not moved.

In the negative pressure abnormality detection apparatus 10 according to the first embodiment, the abnormality detection ECU 42 reads the respective signals that are output by the negative pressure sensor 46, the rotational speed sensor 48, the master pressure sensor 50, and the pedal stroke sensor 52, and detects the corresponding sensor values at every predetermined interval. Then, the abnormality detection ECU 42 uses the thus detected sensor values, detects a state where it is expected that no negative pressure is generated at the negative pressure generation position, and, after detecting the state, then determines, based on the sensor value of the negative pressure sensor 46, whether a negative pressure is generated at the negative pressure generation position. Then, based on the determination result, the abnormality detection ECU 42 determines whether the negative pressure sensor 46 is in an abnormal condition.

Actually, the abnormality detection ECU 42 detects the rotational speed NE of the internal combustion engine 12 that is the sensor value of the rotational speed sensor 48. In order to thus determine the state where it is expected that no negative pressure is generated at the negative pressure generation position, the abnormality detection ECU 42 first determines whether the rotational speed NE is less than or equal to a predetermined value NE0 (step 100 in FIG. 3). Note that, the predetermined value NE0 can be the maximum rotational speed indicating that the internal combustion engine 12 is rotated not so fast as to generate an intake air negative pressure, and, for example, the predetermined value NE0 can be set to be 0 rpm indicating a state where the rotation has been stopped. It is also possible that the predetermined value NE0 is set depending on the performance of the internal combustion engine 12, the performance of the brake booster 22, and/or the like. If the abnormality detection ECU 42 determines that the condition NE≤NE0 is not satisfied (NO in step 100), i.e., the condition NE>NE0 is satisfied, the abnormality detection ECU 42 determines that the current state is such that, due to the rotation of the internal combustion engine 12, a negative pressure can be generated at the negative pressure generation position, and finishes the current process.

On the other hand, if the abnormality detection ECU 42 determines that the condition NE≤NE0 is satisfied (YES in step 100), the abnormality detection ECU 42 then determines that the current state is such that, as a result of the rotation of the internal combustion engine 12 having been reduced or stopped, no negative pressure is supplied to the negative pressure generation position. Thus, the abnormality detection ECU 42 then determines whether a state where such an operation is performed on the brake pedal 20 as to decrease the negative pressure at the negative pressure generation position satisfies a predetermined condition (step 110).

Note that, this predetermined condition can be, for example, a condition that the number of times of brake operations (for example, the number of times of brake returning operations) based on the sensor value of the pedal stroke sensor 52 or the master pressure sensor 50 has reached a predetermined number of times; a condition that the period of time of brake operation (for example, the total period of time of brake returning operations being performed) based on the sensor value of the pedal stroke sensor 52 or the master pressure sensor 50 has reached a predetermined period of time; a condition that the total amount of brake operation (for example, the total of the operation amounts of respective brake returning operations) based on the sensor value of the pedal stroke sensor 52 or the master pressure sensor 50 has reached a predetermined amount, or so. The above-mentioned predetermined number of times, predetermined period of time and predetermined amount can be set depending on the performance of the internal combustion engine 12, the performance of the brake booster 22, and/or the like.

The above-mentioned number of times of brake operations can be calculated in such a manner that, for example, the value is incremented by "1" each time when, after the brake operation stroke amount based on the sensor value of the pedal stroke sensor 52 became to be greater than or equal to a first predetermined value, the brake operation stroke amount has become to be less than or equal to a second predetermined value less than the first predetermined threshold. The above-mentioned total amount of brake operation can be calculated as follows, for example. First, a first value of the brake operation stroke amount acquired when, after the brake operation stroke amount based on the sensor value of the pedal stroke sensor 52 started increasing (i.e., the brake pedal 20 started being trodden on), the increase has finished (i.e., the brake pedal 20 has been trodden on the most). Then, a second value of the brake operation stroke amount is acquired when, after the brake operation stroke amount started reducing (i.e., the brake pedal 20 started being returned), the reduction has been finished (i.e., the returning the brake pedal 20 has been finished). Then, the difference between the first value and the second value is acquired. Then, the thus acquired differences at the respective times of the brake returning operations are totaled to acquire the total amount of brake returning operation.

If this "total amount of brake operation" is used as the predetermined condition, the following advantageous effect can be acquired in comparison to a case of using the above-mentioned "number of times of brake operations" as the predetermined condition. That is, it is possible to include, in the "total amount of brake operation", the brake operation amounts corresponding to such negative pressure decreasing operations of the brake pedal 20 as to have the brake operation amounts too small to be able to be counted in the "number of times of brake operations", if any. Thus, it is possible to rapidly determine the abnormality in the negative pressure sensor 46, if any.

Returning to the description of FIG. 3, if the abnormality detection ECU 42 determines in step 110 that a state where such an operation is performed on the brake pedal 20 as to decrease the negative pressure at the negative pressure generation position does not satisfy the predetermined condition (NO in step 110), the abnormality detection ECU 42 then determines that there is a likelihood that a negative pressure remains at the negative pressure generation position, and finishes the current process.

On the other hand, if the abnormality detection ECU 42 determines in step 110 that a state where such an operation is performed on the brake pedal 20 as to decrease the negative pressure at the negative pressure generation position satisfies the predetermined condition (YES in step 110), the abnormality detection ECU 42 then determines whether the negative pressure Pvac at the negative pressure generation position based on the sensor value of the negative pressure sensor 46 falls within a normal range near atmospheric pressure or is greater than the normal range (step 120). According to the first embodiment, an object is to detect especially a vacuum-pressure-side deviation abnormality in the negative pressure sensor 46. Therefore, even if the sensor value of the negative pressure sensor 46 deviates from the actual negative pressure to the positive pressure side, the abnormality detection ECU 42 does not determine that the negative pressure sensor 46 is in an abnormal condition. The normal range is a threshold range between a value on a positive pressure side and a value on a negative pressure side with respect to atmospheric pressure as a reference value, and is previously determined experimentally or logically. By using the normal range, it is determined whether the negative pressure sensor 46 has a vacuum-pressure-side deviation abnormality in the negative pressure sensor 46.

If the abnormality detection ECU 42 determines in step 120 that the negative pressure Pvac based on the sensor value falls within the normal range or is greater than the normal range (NO in step 120), the abnormality detection ECU 42 then determines that the negative pressure sensor 46 is in a normal condition (step 130). Actually, if a condition that "the absolute value of the sensor value of the negative pressure sensor 46 (i.e., |NEGATIVE PRESSURE SENSOR VALUE|) is less than the normal range" is not satisfied (NO in step 120), this means that the negative pressure Pvac falls within the normal range or is greater than the normal range. On the other hand, if the abnormality detection ECU 42 determines that the negative pressure Pvac based on the sensor value is out of the normal range to the vacuum pressure side (YES in step 120), the abnormality detection ECU 42 determines that the negative pressure sensor 46 is in an abnormal condition (step 140). Actually, if the condition that "the absolute value of the sensor value of the negative pressure sensor 46 (i.e., |NEGATIVE PRESSURE SENSOR VALUE|) is less than the normal range" is satisfied (YES in step 120), this means that the negative pressure Pvac is out of the normal range to the vacuum pressure side.

If the abnormality detection ECU 42 determines in step 140 of FIG. 3A that the negative pressure sensor 46 is in an abnormal condition, then the abnormality detection ECU 42 sends an instruction to the engine ECU 40 via the in-vehicle LAN 44 to cause it to inhibit automatic stopping of the internal combustion engine 12 due to S & S control, also carries out diagnostic storage of information indicating the abnormality of the negative pressure sensor 46, and also, turns on the MIL 54 to report to the driver the abnormality of the negative pressure sensor 46 or the inhibition of automatic stopping of the internal combustion engine 12, as an abnormality process. Thus, when it is determined that the negative pressure sensor 46 is in an abnormal condition, automatic stopping of the internal combustion engine 12 is inhibited. However, it is also possible that, when it is determined that the negative pressure sensor 46 is in an abnormal condition, not only automatic stopping of the internal combustion engine 12 is inhibited, but also the internal combustion engine 12 is automatically started if it is determined that the negative pressure sensor 46 is in an abnormal condition during automatic stopping of the internal combustion engine 12.

If the abnormality detection ECU 42 determines in step 130 that the negative pressure sensor 46 is in a normal condition, the abnormality detection ECU 42 then sends an instruction to the engine ECU 40 via the in-vehicle LAN 44 to cause it to stop inhibition of automatic stopping of the internal combustion engine 12 due to S & S control, and turns off the MIL 54 to remove such a report to the driver of the abnormality of the negative pressure sensor 46 or the inhibition of automatic stopping of the internal combustion engine 12 as a normality process.

In the control apparatus 14 of the internal combustion engine 12, when the engine ECU 40 receives from the abnormality detection ECU 42 the instruction to inhibit automatic stopping of the internal combustion engine 12 due to S & S control, it inhibits automatic stopping of the internal combustion engine 12 due to S & S control. Thus, it is possible to inhibit automatic stopping of the internal combustion engine 12 due to S & S control at a time of the abnormality in the negative pressure sensor 46. On the other hand, when the engine ECU 40 receives from the abnormality detection ECU 42 the instruction to stop inhibition of automatic stopping of the internal combustion engine 12 due to S & S control, it stops inhibition of automatic stopping of the internal combustion engine 12 due to S & S control. Thus, after the negative pressure sensor 46 returns to a normal condition, it is possible to stop inhibition of automatic stopping of the internal combustion engine 12 due to S & S control, and permit the automatic stopping.

Thus, in the negative pressure abnormality detection apparatus 10 according to the first embodiment, it is possible to determine whether the negative pressure sensor 46 is in an abnormal condition based on whether the negative pressure Pvac as the sensor value of the negative pressure sensor 46 falls within the normal range near atmospheric pressure or is greater than the normal range in a state where it is expected that no negative pressure is generated at the negative pressure generation position.

Actually, it is possible to determine that the negative pressure sensor 46 is in a normal condition if the negative pressure sensor 46 has the sensor value of the negative pressure Pvac within the normal range near atmospheric pressure or is greater than the normal range under the condition where an operation on the brake pedal 20 decreasing the negative pressure generated at the negative pressure generation position satisfies a predetermined condition (for example, the number of times of brake operations reaches a predetermined number of times, the period of time of brake operation reaches a predetermined period of time, or the total amount of brake operation reaches a predetermined amount) when a state where the rotation of the internal combustion engine 12 has been reduced or stopped so as not to generate a negative pressure in the directly driven negative pressure pump 30 is detected and the detected state is currently being continued. In contrast thereto, it is possible to determine that the negative pressure sensor 46 is in an abnormal condition if the negative pressure sensor 46 has the sensor value of the negative pressure Pvac out of the normal range near atmospheric pressure to the vacuum pressure side under the condition where an operation on the brake pedal 20 decreasing the negative pressure generated at the negative pressure generation position satisfies the above-mentioned predetermined condition when a state where the rotation of the internal combustion engine 12 has been reduced or stopped so as not to generate negative pressure in the directly driven negative pressure pump 30 is detected and the state is currently being continued.

It is possible to determine that the negative pressure sensor 46 has a vacuum-pressure-side deviation abnormality in the negative pressure sensor 46 if the negative pressure sensor 46 has the sensor value out of the normal range near atmospheric pressure to the vacuum pressure side under the condition where it is expected that no negative pressure is generated at the negative pressure generation position because the rotation of the internal combustion engine 12 has been reduced or stopped and also such a braking operation as to decrease the negative pressure at the negative pressure generation position is performed. For example, if the negative pressure Pvac based on the sensor value is on the vacuum pressure side of the normal range, it can be determined that a vacuum-pressure-side deviation abnormality occurs.

Therefore, in the negative pressure abnormality detection apparatus 10 according to the first embodiment, it is possible to detect a vacuum-pressure-side deviation abnormality in the negative pressure sensor 46. In particular, even if such an offset that the negative pressure value of the negative pressure sensor 46 deviates from an actual negative pressure to the vacuum pressure side as a deviation abnormality, it is possible to detect it.

Also, according to the first embodiment, a determination as to whether the negative pressure sensor 46 has the abnormality is made at a timing when no negative pressure is expected to be generated at the negative pressure generation position due to a continuation of a state where the rotation of the internal combustion engine 12 has been reduced or stopped due to, for example, the vehicle ignition being turned off, engine stall, automatic stopping caused by S & S control, or so. In this configuration, it is possible to determine whether the negative pressure sensor 46 has the abnormality even if no negative pressure is generated at the negative pressure generation position. Therefore, it is possible to increase the number of times of determination as to whether the negative pressure sensor 46 has the abnormality. Also, in this configuration, after the negative pressure sensor 46 actually has a vacuum-pressure-side deviation abnormality, it is possible to make a determination as to whether the negative pressure sensor 46 has the abnormality at a timing when the rotation of the internal combustion engine 12 has been reduced or stopped due to automatic stopping caused by S & S control or so. Thus, it is possible to rapidly detect a vacuum-pressure-side deviation abnormality of the negative pressure sensor 46.

Also, according to the first embodiment, a determination as to whether the negative pressure sensor 46 has the abnormality is made only if a state where a braking operation decreasing the negative pressure at the negative pressure generation position is performed satisfies a predetermined condition during a continuation of a state where the rotation of the internal combustion engine 12 has been reduced or stopped. In this configuration, it is possible to ensure that no negative pressure is generated at the negative pressure generation position due to a negative pressure decrease caused by a braking operation, when determining whether the negative pressure sensor 46 has the abnormality, after the rotation of the internal combustion engine 12 is reduced or stopped. Therefore, it is possible to improve the accuracy in determining whether the negative pressure sensor 46 has the abnormality.

Also, in this configuration, the condition that the negative pressure decreases at the negative pressure generation position is imposed to determine whether the negative pressure sensor 46 has the abnormality during a state where the rotation of the internal combustion engine 12 has been reduced or stopped. Therefore, in comparison to a case where the condition that the negative pressure decreases at the negative pressure generation position is not imposed, it is possible to rapidly carry out a determination as to whether the negative pressure sensor 46 has the abnormality because it is possible to increase the speed of decreasing the negative pressure at the negative pressure generation position due to a negative pressure decrease caused by a braking operation, after the rotation of the internal combustion engine 12 is reduced or stopped.

Also, in the first embodiment, the abnormality detection ECU 42 sends an instruction to the engine ECU 40 of the control apparatus 14 via the in-vehicle LAN 44 to cause it to automatically start the internal combustion engine 12 due to S & S control when the negative pressure abnormality detection apparatus 10 detects that the negative pressure Pvac at the negative pressure generation position detected by using the negative pressure sensor 46 has a value on the atmospheric pressure side of the predetermined negative pressure during automatic stopping of the internal combustion engine 12 due to S & S control. Also, when the negative pressure abnormality detection apparatus 10 detects that the negative pressure sensor 46 is in an abnormal condition, the abnormality detection ECU 42 sends an instruction to the engine ECU 40 of the control apparatus 14 via the in-vehicle LAN 44 to cause it to inhibit automatic stopping of the internal combustion engine 12 due to S & S control.

Thus, according to the first embodiment, it is possible to stop automatic stopping of the internal combustion engine 12 due to S & S control and automatically start the internal combustion engine 12 if the negative pressure at the negative pressure generation position comes to be on the atmospheric pressure side of the predetermined negative pressure during the automatic stopping of the internal combustion engine 12 due to S & S control and thereby it would be difficult to ensure stopping the vehicle 16 if the situation were kept unchanged. Thus, it is possible to restart generating a negative pressure in the brake booster 22 and generate such an assisting force in the brake booster 22 as to ensure stopping the vehicle 16.

If the negative pressure sensor 46 has a vacuum-pressure-side deviation abnormality, there is a case where, although the actual negative pressure is on the atmospheric pressure side of the predetermined negative pressure, the negative pressure sensor 46 has the sensor value of the negative pressure kept greater than or equal to the predetermined negative pressure. In this case, it is not possible to stop automatic stopping of the internal combustion engine 12 and automatically start the internal combustion engine 12 only with such a control way as to stop automatic stopping of the internal combustion engine 12 due to S & S control and automatically start the internal combustion engine 12 based on a determination result as to whether the negative pressure is on the atmospheric pressure side of the predetermined negative pressure. Thus, it might be difficult to generate such an assisting force as to ensure stopping the vehicle 16.

According to the first embodiment, it is possible to inhibit automatic stopping of the internal combustion engine 12 due to S & S control and drive the internal combustion engine 12 when it is detected that the negative pressure sensor 46 has a vacuum-pressure-side deviation abnormality including an offset deviation to the vacuum pressure side. Therefore, it is possible to supply a negative pressure to the brake booster 22 and generate such an assisting force in the brake booster 22 as to ensure stopping the vehicle 16. Therefore, in the control apparatus 14 of the internal combustion engine 12 according to the first embodiment, when the negative pressure sensor 46 has a vacuum-pressure-side deviation abnormality including an offset deviation to the vacuum pressure side, it is possible to avoid the above-mentioned inconvenience caused by automatic stopping of the internal combustion engine 12.

Also, in the first embodiment, as mentioned above, when it is determined that the negative pressure sensor 46 is in an abnormal condition, diagnostic storage of information of the abnormality of the negative pressure sensor 46 is carried out. Therefore, according to the first embodiment, the position where the abnormality is present in the vehicle 16 can be easily determined by a vehicle dealer or so after the negative pressure sensor 46 has the abnormality.

Also, in the first embodiment, as mentioned above, when it is determined that the negative pressure sensor 46 is in an abnormal condition or automatic stopping of the internal combustion engine 12 due to S & S control is inhibited due to the abnormality determination concerning the negative pressure sensor 46, thereafter the MIL 54 is turned on to report the abnormality of the negative pressure sensor 46 or the inhibition of automatic stopping of the internal combustion engine 12. In this case, the driver can know about the abnormality of the negative pressure sensor 46 or the inhibition of automatic stopping of the internal combustion engine 12 by seeing the MIL 54. Therefore, according to the first embodiment, when the abnormality of the negative pressure sensor 46 occurs, the abnormality of the negative pressure sensor 46 or inhibition of automatic stopping of the internal combustion engine 12 due to the abnormality is rapidly reported to the driver with the MIL 54. Therefore, it is possible that the driver is urged to replace or repair the negative pressure sensor 46 having the abnormality.

Also, in the first embodiment, if it is determined that the negative pressure sensor 46 is in a normal condition after it is determined that the negative pressure sensor 46 is in an abnormal condition, the inhibition of automatic stopping of the internal combustion engine 12 due to S & S control is stopped, and also, the MIL 54 is turned off. Therefore, according to the first embodiment, after the negative pressure sensor 46 returns to a normal condition from an abnormal condition, automatic stopping of the internal combustion engine 12 due to S & S control is permitted, and therefore, it is possible to reduce the fuel consumption, and also, it is possible to avoid useless replacement or repair work on the negative pressure sensor 46.

Note that, in the first embodiment, the directly driven negative pressure pump 30 corresponds to a "negative pressure generation part". The abnormality detection ECU 42 of the negative pressure abnormality detection apparatus 10 detecting the negative pressure Pvac at the negative pressure generation position based on the signal supplied by the negative pressure sensor 46 corresponds to a "negative pressure detection part". The abnormality detection ECU 42 carrying out step 140 in the routine shown in FIG. 3 corresponds to an "abnormality determination part".

Also, in the first embodiment, the engine ECU 40 of the control apparatus 14 carrying out S & S control corresponds to an "automatic control part". The engine ECU 40 inhibiting automatic stopping of the internal combustion engine 12 due to S & S control according to an instruction from the abnormality detection ECU 42 corresponds to an "automatic stopping inhibition part".

Figure 4:
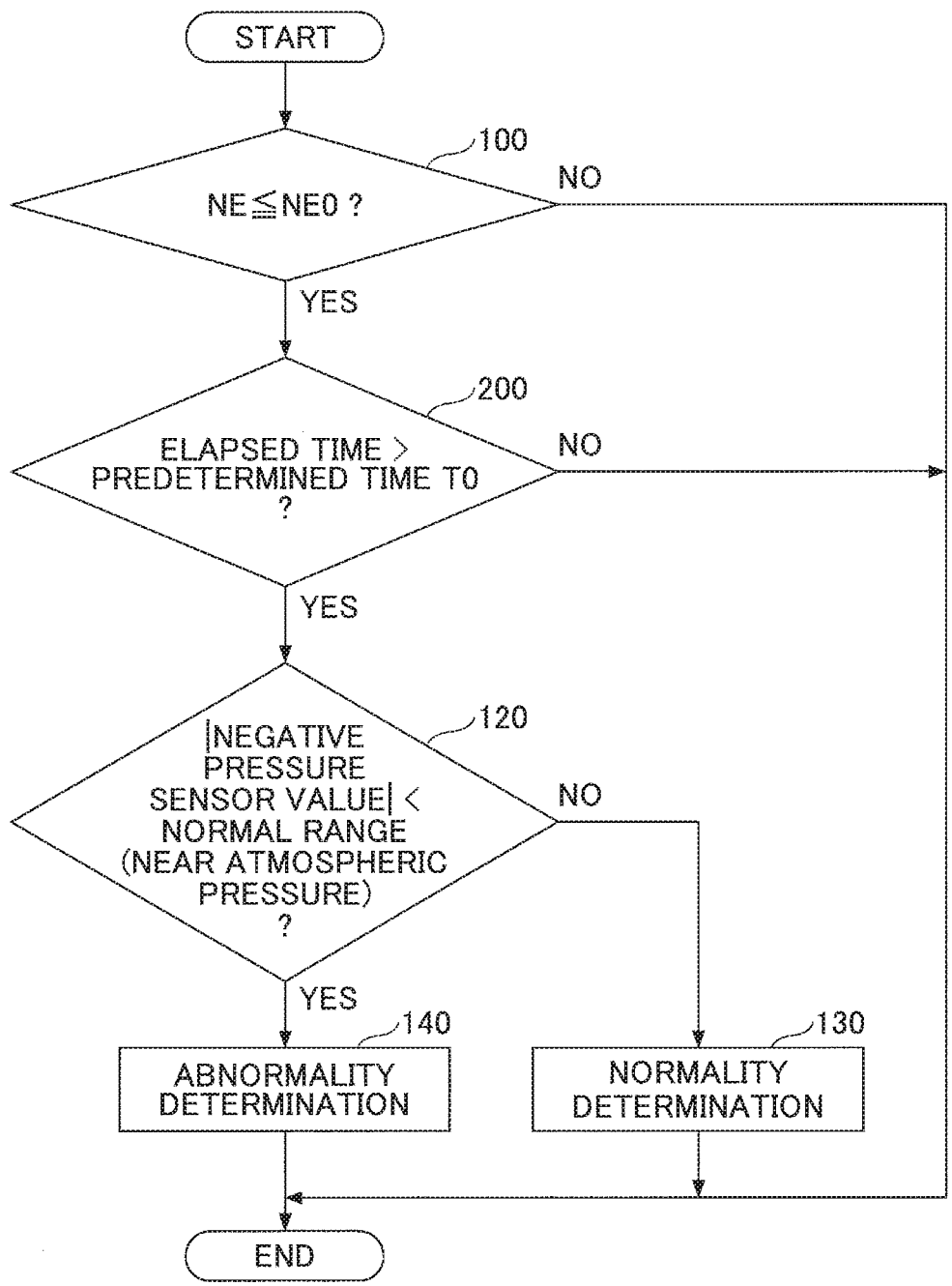
FIG. 4 is a flowchart illustrating an example of a control routine executed by the negative pressure abnormality detection apparatus and the control apparatus for the internal combustion engine according to a second embodiment.

In the first embodiment, a determination as to whether the negative pressure sensor 46 has the abnormality is carried out, under the condition where a state of a braking operation decreasing the negative pressure at the negative pressure generation position being performed satisfies a predetermined condition, during a continuation of a state where the rotation of the internal combustion engine 12 has been reduced or stopped. However, embodiments are not limited thereto. As shown in FIG. 4, a determination as to whether the negative pressure sensor 46 has the abnormality can be carried out when a state where the rotation of the internal combustion engine 12 has been reduced or stopped has been continued for a predetermined period.

FIG. 4 is a flowchart illustrating an example of a control routine executed by the negative pressure abnormality detection apparatus and the control apparatus for the internal combustion engine according to the second embodiment. Note that, in FIG. 4, the same signs are given to steps executing the same processes as those in the routine shown in FIG. 3, and the description thereof are omitted or simplified.

According to the second embodiment, when the abnormality detection ECU 42 determines in step 100 that the condition NE≤NE0 is satisfied, the abnormality detection ECU 42 then determines whether a state where the rotational speed NE of the internal combustion engine 12 based on the sensor value of the rotational speed sensor 48 is less than or equal to the predetermined value NE0 is continued for a predetermined period of time T0 (step 200). Note that, the predetermined period of time T0 is a period of time of continuation of a state where the rotational speed NE of the internal combustion engine 12 is less than or equal to the predetermined value NE0 is continued, for which, after the rotational speed NE of the internal combustion engine 12 is reduced to be less than or equal to the predetermined value NE0, the negative pressure at the negative pressure generation position is expected to become approximately atmospheric pressure. The predetermined period of time T0 is previously set experimentally or logically. Also, the predetermined period of time T0 can be set according to the performance of the internal combustion engine 12 and/or the performance of the brake booster 22.

Returning to FIG. 4, when the abnormality detection ECU 42 determines in step 200 that the state where the rotational speed NE is less than or equal to the predetermined value NE0 has not been continued for the predetermined period of time T0, the abnormality detection ECU 42 determines that a negative pressure may be left at the negative pressure generation position, and finishes the current process. On the other hand, when the abnormality detection ECU 42 determines in step 200 that the state where the rotational speed NE is less than or equal to the predetermined value NE0 has been continued for the predetermined period of time T0, the abnormality detection ECU 42 then determines whether the negative pressure Pvac at the negative pressure generation position based on the sensor value of the negative pressure sensor 46 falls within the normal range near atmospheric pressure or is greater than the normal range (step 120).

Thus, also in the second embodiment, it is possible to determine whether the negative pressure sensor 46 is in an abnormal condition based on whether the negative pressure Pvac as the sensor value of the negative pressure sensor 46 falls within the normal range near atmospheric pressure or is greater than the normal range in a state where it is expected that no negative pressure is generated at the negative pressure generation position. Actually, if the negative pressure sensor 46 has the sensor value of the negative pressure Pvac within the normal range near atmospheric pressure or is greater than the normal range under the condition where such a state of the rotation of the internal combustion engine 12 having been reduced or stopped that the internal combustion engine 12 does not cause the directly driven negative pressure pump 30 to generate a negative pressure has been continued greater than or equal to the predetermined period of time T0, it can be determined that the negative pressure sensor 46 is in a normal condition. On the other hand, if the negative pressure sensor 46 has the sensor value of the negative pressure Pvac out of the normal range near atmospheric pressure to the vacuum pressure side under the condition where such a state of the rotation of the internal combustion engine 12 having been reduced or stopped that the internal combustion engine 12 does not cause the directly driven negative pressure pump 30 to generate a negative pressure has been continued greater than or equal to the predetermined period of time T0, it can be determined that the negative pressure sensor 46 is in an abnormal condition.

Therefore, also in the negative pressure abnormality detection apparatus 10 of the second embodiment, it is possible to detect a vacuum-pressure-side deviation abnormality in the negative pressure sensor 46. In particular, even if such an offset that the negative pressure value of the negative pressure sensor 46 deviates from the actual negative pressure to the vacuum pressure side as a deviation abnormality, it is possible to detect it.

Also, in the second embodiment, a determination as to whether the negative pressure sensor 46 has the abnormality is made at a timing when no negative pressure is expected to be generated at the negative pressure generation position as a result of continuation of a state where the rotation of the internal combustion engine 12 has been reduced or stopped greater than or equal to the predetermined period of time T0 due to, for example, the vehicle ignition being turned off, engine stall, automatic stopping caused by S & S control, or so. Also in this configuration, it is possible to determine whether the negative pressure sensor 46 has the abnormality even if no negative pressure is generated at the negative pressure generation position. Therefore, it is possible to increase the number of times of determination as to whether the negative pressure sensor 46 has the abnormality. Also, in this configuration, after the negative pressure sensor 46 actually has a vacuum-pressure side deviation abnormality, it is possible to determine whether the negative pressure sensor 46 has the abnormality, at timing when the rotation of the internal combustion engine 12 has been reduced or stopped due to automatic stopping caused by S & S control or so. Thus, it is possible to rapidly detect a vacuum-pressure side deviation abnormality of the negative pressure sensor 46.

Also in the second embodiment, in the same way as the above-mentioned first embodiment, the abnormality detection ECU 42 of the negative pressure abnormality detection apparatus 10 sends an instruction to the engine ECU 40 of the control apparatus 14 via the in-vehicle LAN 44 to cause it to inhibit automatic stopping of the internal combustion engine 12 due to S & S control or an instruction to cause the engine ECU 40 to automatically start the internal combustion engine 12 due to S & S control, also in a case where the negative pressure abnormality detection apparatus 10 detects that the negative pressure Pvac at the negative pressure generation position detected by using the negative pressure sensor 46 has a value on the atmospheric pressure side of the predetermined negative pressure during automatic stopping of the internal combustion engine 12 due to S & S control, and also in a case where the negative pressure abnormality detection apparatus 10 determines that the negative pressure sensor 46 is in an abnormal condition. Therefore, also the second embodiment can acquire the same advantageous effects as those of the first embodiment.

Also, in the above-mentioned embodiments, as the negative pressure generation part generating a negative pressure to be supplied to the brake booster 22, the directly driven negative pressure pump 30 that is rotated due to the rotation of the internal combustion engine 12 is used. However, embodiments are not limited thereto. It is also possible to use an intake manifold that the internal combustion engine 12 has for the same purpose.

Also, in the above-mentioned embodiments, when it is determined that the negative pressure sensor 46 is in an abnormal condition, automatic stopping of the internal combustion engine 12 due to S & S control is inhibited. However, embodiments are not limited thereto. It is also possible to restrictively permit automatic stopping of the internal combustion engine 12 due to S & S control even when it is determined that the negative pressure sensor 46 is in an abnormal condition. For example, it is possible that, when it is determined that the negative pressure sensor 46 is in an abnormal condition, zero point correction of the negative pressure sensor 46, a change in an action-permitting threshold for permitting automatic stopping of the internal combustion engine 12 due to S & S control, and/or the like, are carried out. Note that, the change in the action-permitting threshold can be, for example, adding an allowance corresponding to a possible precision degradation of the negative pressure sensor 46 to the action-permitting threshold that is used when the negative pressure sensor 46 is in a normal condition.

Also, in the above-mentioned embodiments, the MIL 54 that is an indication lamp installed in the meter is used to report the abnormality of the negative pressure sensor 46 or inhibition of automatic stopping of the internal combustion engine 12 due to the abnormality to the driver. However, embodiments are not limited thereto. It is also possible to use another type of an indication device. It is also possible to use an acoustic reporting device instead of or in addition of such a visual reporting device as the MIL 54.

Also, in the above-mentioned embodiments, the abnormality detection ECU 42 of the negative pressure abnormality detection apparatus 10 and the engine ECU 40 of the control apparatus 14 of the internal combustion engine 12 are separate apparatuses connected via the in-vehicle LAN 44 therebetween. However, embodiments are not limited thereto. It is also possible that the abnormality detection ECU 42 and the engine ECU 40 are configured to be a single ECU.

Thus, the negative pressure abnormality detection apparatuses and the control apparatuses for the internal combustion engines have been described in the embodiments. However, the present disclosure is not limited to such specific embodiments. Various modifications can be made without departing from the claimed subject matter.

Thus, according to the embodiments, it is possible to detect a vacuum-pressure-side deviation abnormality in a negative pressure sensor. Also, it is possible to avoid such an inconvenience otherwise occurring due to an internal combustion engine being automatically stopped even when a negative pressure sensor has a vacuum-pressure-side deviation abnormality.

What is claimed is:

1. A negative pressure abnormality detection apparatus comprising:
   a negative pressure sensor that outputs a signal corresponding to a negative pressure that a negative pressure generation part generates through rotation of an internal combustion engine, the negative pressure assisting a vehicle driver's tread operation onto a brake pedal;
   a negative pressure detection part that detects the negative pressure based on the signal that is output by the negative pressure sensor; and
   an abnormality determination part that determines, during a period of time when a stopped state of the internal combustion engine is being continued, that the negative pressure sensor is in an abnormal condition if the negative pressure detected by the negative pressure detection part is out of a normal range near an atmospheric pressure to a vacuum pressure side under the condition where:
      (i) a negative pressure decreasing operation of decreasing the negative pressure has been performed on the brake pedal greater than or equal to a predetermined number of times,
      (ii) the negative pressure decreasing operation of decreasing the negative pressure has been performed on the brake pedal greater than or equal to a predetermined period of time, or
      (iii) a total operation amount of the negative pressure decreasing operation is greater than or equal to a predetermined amount.

2. The negative pressure abnormality detection apparatus as claimed in claim 1, wherein
   the negative pressure decreasing operation includes a brake returning operation of returning from a state of treading on the brake pedal.

3. The negative pressure abnormality detection apparatus as claimed in claim 1, wherein
   the abnormality determination part determines that the negative pressure sensor is in such an abnormal condition as to output the signal deviating to a vacuum pressure side from a true value when the negative pressure detected by the negative pressure detection part is on the vacuum pressure side of the normal range.

4. The negative pressure abnormality detection apparatus as claimed in claim 2, wherein
   the abnormality determination part determines that the negative pressure sensor is in such an abnormal condition as to output the signal deviating to a vacuum pressure side from a true value when the negative pressure detected by the negative pressure detection part is on a vacuum pressure side of the normal range.

5. A negative pressure abnormality detection apparatus comprising:
   a negative pressure sensor that outputs a signal corresponding to a negative pressure that a negative pressure generation part generates through rotation of an internal combustion engine, the negative pressure assisting a vehicle driver's tread operation onto a brake pedal;
   a negative pressure detection part that detects the negative pressure based on the signal that is output by the negative pressure sensor; and
   an abnormality determination part that determines that the negative pressure sensor is in an abnormal condition if the negative pressure detected by the negative pressure detection part is out of a normal range near an atmospheric pressure to a vacuum pressure side when a stopped state of the internal combustion engine has been continued greater than or equal to a predetermined period of time.

6. The negative pressure abnormality detection apparatus as claimed in claim 5, wherein
   the abnormality determination part determines that the negative pressure sensor is in such an abnormal condition as to output the signal deviating to a vacuum pressure side from a true value when the negative pressure detected by the negative pressure detection part is on a vacuum pressure side of the normal range.

7. A control apparatus for controlling an internal combustion engine, comprising:
  an automatic control part that automatically stops the internal combustion engine when a predetermined stopping condition is satisfied and automatically restarts the internal combustion engine when a predetermined restart condition is satisfied, and
  an automatic stopping inhibition part that inhibits the automatic control part from automatically stopping the internal combustion engine when the abnormality determination part of the negative pressure abnormality detection apparatus claimed in claim 1 determines that the negative pressure sensor is in the abnormal condition.

8. The control apparatus as claimed in claim 7, wherein the negative pressure decreasing operation checked in the negative pressure abnormality detection apparatus includes a brake returning operation of returning from a state of treading on the brake pedal.

9. The control apparatus as claimed in claim 7, wherein the abnormality determination part in the negative pressure abnormality detection apparatus determines that the negative pressure sensor is in such an abnormal condition as to output the signal deviating to a vacuum pressure side from a true value when the negative pressure detected by the negative pressure detection part is on the vacuum pressure side of the normal range.

10. The control apparatus as claimed in claim 8, wherein the abnormality determination part in the negative pressure abnormality detection apparatus determines that the negative pressure sensor is in such an abnormal condition as to output the signal deviating to a vacuum pressure side from a true value when the negative pressure detected by the negative pressure detection part is on a vacuum pressure side of the normal range.

11. A control apparatus for controlling an internal combustion engine, comprising:
  an automatic control part that automatically stops the internal combustion engine when a predetermined stopping condition is satisfied and automatically restarts the internal combustion engine when a predetermined restart condition is satisfied, and
  an automatic stopping inhibition part that inhibits the automatic control part from automatically stopping the internal combustion engine when the abnormality determination part of the negative pressure abnormality detection apparatus claimed in claim 5 determines that the negative pressure sensor is in the abnormal condition.

12. The control apparatus as claimed in claim 11, wherein the abnormality determination part in the negative pressure abnormality detection apparatus determines that the negative pressure sensor is in such an abnormal condition as to output the signal deviating to a vacuum pressure side from a true value when the negative pressure detected by the negative pressure detection part is on a vacuum pressure side of the normal range.

* * * * *